United States Patent Office 3,541,318
Patented Nov. 17, 1970

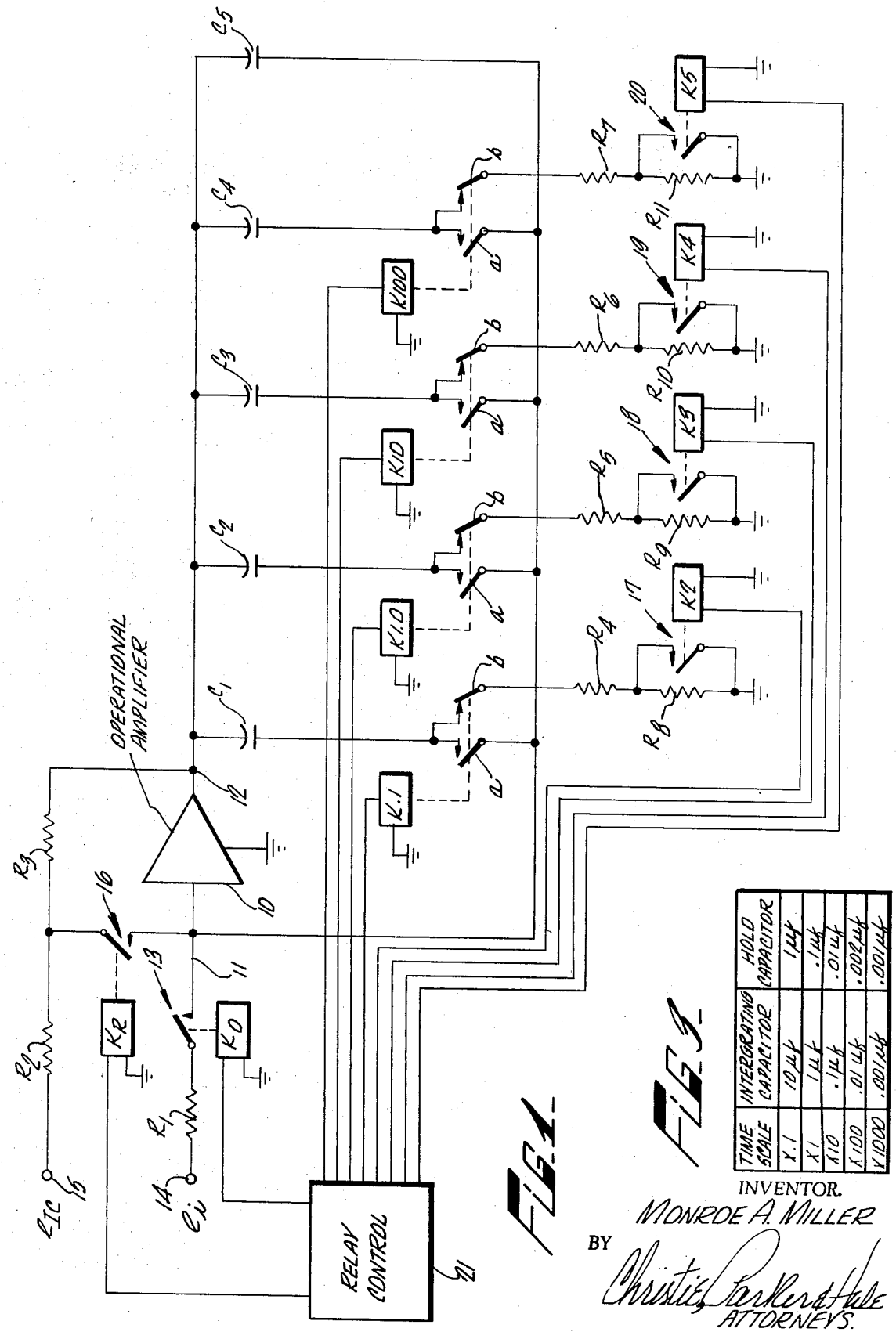

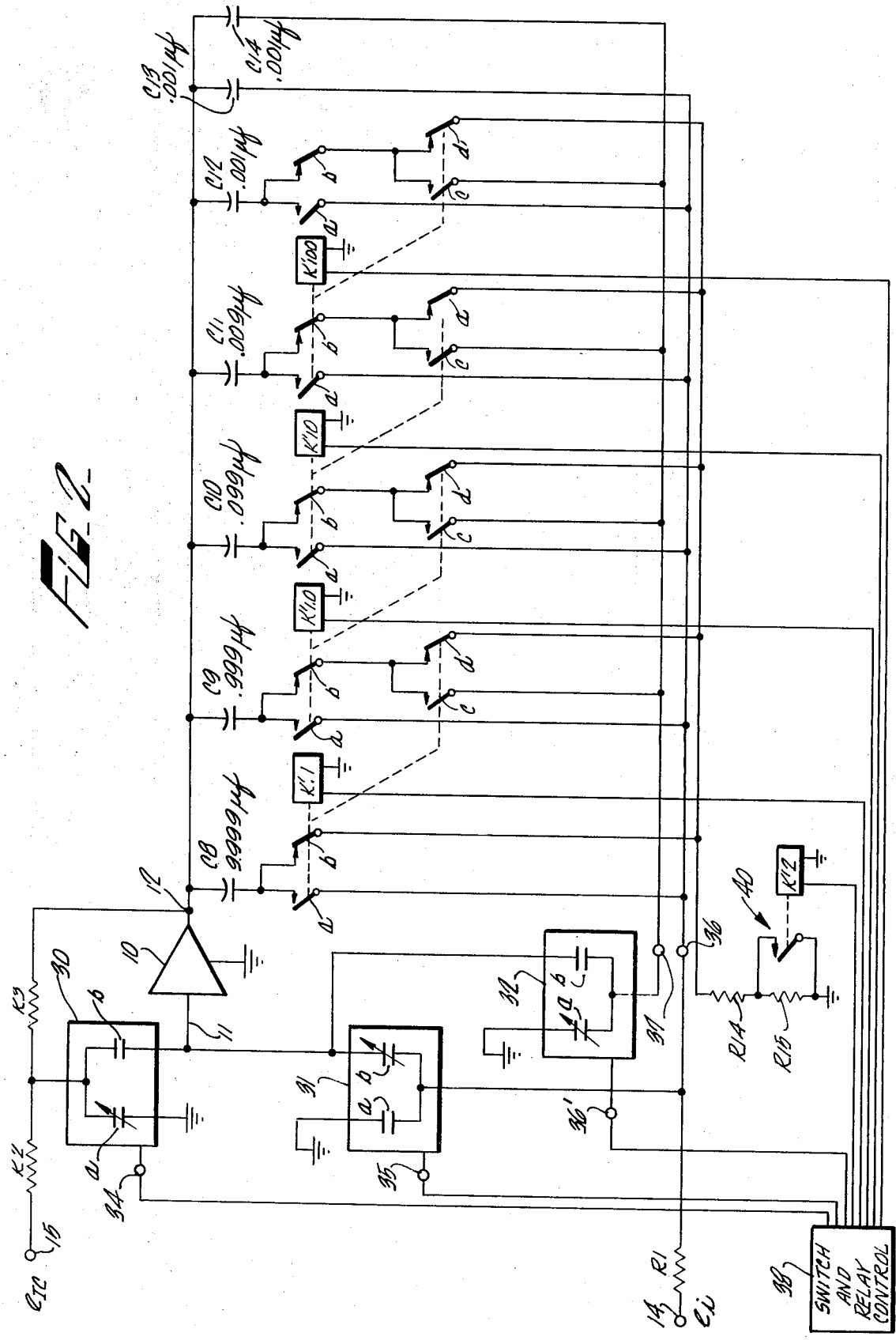

3,541,318
ANALOG INTEGRATING SYSTEM WITH
VARIABLE TIME SCALE
Monroe A. Miller, Coral Gables, Fla., assignor to Milgo
Electronic Corporation, Miami, Fla., a corporation of
Florida
Filed Aug. 3, 1966, Ser. No. 569,855
Int. Cl. G06g 7/18
U.S. Cl. 238—183                                    9 Claims

ABSTRACT OF THE DISCLOSURE

Apparatus for selectively varying the time scale of integrator circuits. An integrator circuit is provided with an input terminal for receiving the signal to be integrated, a first resistance, an operational amplifier having an input and an output and a plurality of capacitors. Switching means are provided for selectively connecting and disconnecting the input terminal and the first resistance in series to the amplifier input. Switching means are also provided for selectively connecting at least one of the capacitors between the input and output of the amplifier.

Means are further provided for connecting at least one of the remaining capacitors and an additional resistance in series between the amplifier output and ground to permit the capacitor to assume a charge bearing a predetermined relation to the amplifier output voltage. Additional means are provided for decreasing the resistance of the additional resistance after the input terminal is disconnected from the amplifier input to permit the capacitor connected to the additional resistance to charge to the amplifier output voltage. The additional capacitor may then be connected between the input and the output of the amplifier to thereby change the time scale of the integrator circuit without subjecting the amplifier to a step difference in output voltage.

This invention relates to inegrator circuits and more particularly to integrator circuits which are useful in analog computers for providing the time integral of an input signal.

Analog computers employ many integrator circuits which may be interconnected with other computing components according to a given computer program. A conventional integrator circuit for use in an analog computer comprises an operational amplifier with a resistance coupling an input signal to the summing junction or input circuit of the amplifier and an integrating capacitor connected between the input and output circuit of the amplifier.

The time scale of the conventional integrator circuit may be varied by changing the value of the integrating capacitor or the input resistor. Where the value of the integrating capacitor is to be changed to vary the time scale a capacitor of the desired value is switched across the amplifier and the computer is then placed in an initial condition state in which an auxiliary voltage is applied to the amplifier input circuit to establish the proper initial voltage across the integrating capacitor. The computer may then be placed in the operate or problem solution mode. In many instances it would be desirable to expand or reduce the time scale of one or more integrator circuits before the problem has been completely run on the computer. For example, if the computer is determining the flight path of a space vehicle it may be highly advantageous to expand the time scale of certain or all of the integrator circuits when the vehicle is leaving and reentering the earth's atmosphere.

On certain prior art analog computers it has been possible to reduce the time scale by decreasing the value of the integrating capacitance before the completion of the problem solution by placing the integrating circuit (and the computer) into the hold condition and decreasing the capacitance of the integrating capacitor across the amplifier. When the computer is placed in the hold condition the problem solution mode is stopped and the values of all of the variables are maintained at the values reached at the instant of time that the problem solution mode is discontinued. To increase the capacitance of the integrating capacitors and thus expand the time scale, however, presents several problems which are not involved in reducing the time scale. For example, any additional or new integrating capacitor that is connected across the amplifier must be initially charged to a value proportional to the amplifier output voltage and it must be so charged without creating any appreciable error in the output voltage. This and other problems have been overcome by the present invention which provides a simple circuit for permitting the time scale of an integrator circuit to be changed either up or down before completion of the problem solution.

In accordance with this invention, an integrator circuit is provided with an input terminal for receiving the signal to be integrated, a first resistance means, an operational amplifier having an input and an output and a plurality of capacitors. Switching means are provided for selectively connecting and disconnecting the input terminal and the first resistance means in series to the amplifier input. Switching means are also provided for selectively connecting at least one of the capacitors between the input and output of the amplifier.

Means are provided for connecting at least one of the remaining capacitors and an additional resistance means in series between the amplifier output and ground to permit the capacitor to assume a charge bearing a predetermined relationship to the amplifier output voltage. Additional means may be provided for decreasing the resistance of the additional resistance means after the input terminal is disconnected from the amplifier input to permit the capacitor connected to the additional resistance means to charge to the amplifier output voltage. The additional capacitor may then be disconnected from the resistance means and connected between the input and output of the amplifier to thereby change the time scale of the integrator circuit.

The invention is described in more detail in connection with the accompanying drawings in which:

FIG. 1 is a schematic circuit diagram of one embodiment of the invention;

FIG. 2 is a schematic circuit diagram of another embodiment of the present invention in which electronic switches are employed to selectively place the integrator circuit into a selected mode of operation; and FIG. 3 is a chart illustrating the time scale of the integrator circuit of FIG. 1 and values for the integrating capacitors and hold capacitors which may be utilized for each time scale.

Referring now to FIG. 1, an operational amplifier 10 is provided with an input 11 and an output 12. A relay switch $K_0$ having contacts 13 and an input resistor $R_1$ is connected between a signal input terminal 14 and the input of the amplifier 10. Input terminal 14 receives the input signal $e_i$ which is to be integrated. An initial condition voltage $e_{IC}$ applied to a terminal 15 may be connected to the amplifier input 11 through a resistor $R_2$ and contacts 16 of a relay switch $K_R$ to charge up an integrating capacitor connected between the input and output of the amplifier so that the output voltage of the amplifier will assume its desired initial condition voltage, as is well known in the art. In the initial condition state of operation a feedback resistor $R_3$ is also connected between the amplifier input and output as shown.

A plurality of capacitors C1, C2, C3, C4 and C5 are connected at one terminal to the output 12 of the amplifier as shown. The other terminal of the capacitor C5 is connected directly to the input circuit 11 of the amplifier. The other terminals of the remaining capacitors C1–C4 are selectively connected to the input 11 of the amplifier or through a resistance means to ground by relay switches K.1, K1.0, K10 and K100, respectively, as shown. Each relay switch K.1, K1.0, K10 and K100 includes two pairs of contacts $a$ and $b$. One pair of contacts is always open when the other pair of contacts are closed and vice versa. As shown in the drawing the contacts $b$ are closed and the contacts $a$ are open to connect each of the capacitors C1–C4 between the output circuit 12 and the associated resistance means to ground.

The resistance means connected to the contacts $b$ of relay K.1 comprise resistors R4 and R8 connected in series to ground. A pair of contacts 17 of a relay switch K2 is connected in parallel with resistor R8 to short circuit or switch resistor R8 out of the circuit when the relay K2 is energized. Resistors R5 and R9 are connected in series to the contacts $b$ of relay K10 and a pair of contacts 18 of a relay switch K3 is connected across the resistor R9 as shown. Resistors R6 and R10 are connected between the contacts $b$ of relay K.1 and ground with a pair of contacts 19 of a relay switch K4 connected across resistor R10. Resistors R7 and R11 are connected between the contacts $b$ of relay switch K100 and ground with a pair of contacts 20 of a relay switch K5 connected across resistor R11.

The relay switches $K_O$, $K_R$, K.1, K1.0, K10, K100, K2, K3, K4, K5 are operated by means of a standard relay control 21. It should be noted that the relay switches of FIG. 1 are illustrated as merely one means of selectively connecting and disconnecting the various elements from the operational amplifier or for short circuiting the resistors R8–R11 as is illustrated in FIG. 1. Solid state switches or other suitable switching means could be provided for accomplishing the switching functions. The switches $K_R$ and $K_O$, however, must have a small impedance in the closed state and a high impedance in the open state or such switches will affect the accuracy of the integrator circuit.

In FIG. 3 there are illustrated five different time scales for the integrating circuit of FIG. 1 and the corresponding value of the integrating capacitors that are connected across the amplifiers. To provide a time scale of $\times 1000$ for the circuit of FIG. 1 the capacitor C5 may have a value of .001 microfarad ($\mu f$). Since capacitor C5 in the circuit of FIG. 1 is always connected across the amplifier 10, the values of the capacitors C1, C2, C3 and C4 must be adjusted accordingly so that the total capacitance connected across the amplifier is equal to the desired value. For example, the capacitor C4 could have a value of .009 $\mu f$. so that when capacitors C4 and C5 are connected across the amplifier 10 the total value of capacitance will be .01 $\mu f$. If it is desired to switch in only one additional capacitor of the capacitors C1 through C4 for a slower time scale, then the capacitor C1, C2 and C3 could have the values of 9.999 $\mu f$., .990 $\mu f$. and .0090 $\mu f$., respectively. If it is desired to switch all of the higher value capacitors across the amplifier to provide a slower time scale, then the value of the capacitors C1, C2 and C3 could be 9.0 $\mu f$., .90 $\mu f$. and .09 $\mu f$., respectively. Thus the value of the capacitors C1, C2 and C3 wil depend upon the manner in which the capacitors are to be switched across the amplifier in the integrating mode.

For purposes of discussing the operation of the circuit of FIG. 1, let us assume that it is desired to switch in all of the higher value capacitors to attain a slow time scale. With the capacitor C5 connected across the amplifier 10 and the contacts 13 of relay switch $K_O$ closed to connect the input terminal 14 and the resistance $R_1$ to the input 11 of the amplifier, the integrator circuit will have a time scale of $\times 1000$. At this time the contacts $b$ of relays K.1, K1.0, K10 and K100 are closed as shown in FIG. 1 and each of the capacitors C1, C2, C3 and C4 will acquire a charge which bears a predetermined relationship to the instantaneous amplifier output voltage. This predetermined relationship is dependent upon the nature of the amplifier output voltage and the time constant of the particular capacitor and its associated resistance network connected to ground. During the integrating mode the contacts of the relay switches K2, K3, K4 and K5 are open as shown in FIG. 1 to provide a high resistance in series with each of the capacitors C1–C4 to reduce the error in the amplifier output voltage.

To change the time scale of the integrator circuit of FIG. 1 it is only necessary to operate the relay switch $K_O$ by the relay control 21 to disconnect input terminal 14 from the input 11 of the amplifier. The capacitor C5 has received a charge proportional to the output voltage and will thus maintain the output voltage of the amplifier substantially constant. The contacts of one or more of the relay switches K2, K3, K4 and K5 are now closed to short circuit one or more of the associated resistors R8, R9, R10 and R11. These resistors preferably have a large resistance as compared to the resistors R4, R5, R6, R7, respectively, to permit the associated capacitors C1, C2, C3, C4 to now assume a charge approximately equal to the output voltage of the amplifier 10. The resistors R4, R5, R6, R7 are left connected in series with the associated capacitors to prevent overloading of the amplifier 10. As soon as a sufficient time has passed to charge the selected capacitors C1–C4 to the amplifier output voltage, one or more of the relay switches K1, K1.0, K10, K100 is actuated by the relay control 21 to close the contacts $a$ thereof and open the contacts $b$. For example, if it is desired to change the time scale to $\times 100$, then only relay K100 is actuated to close contacts $a$. If the time scale is to be changed to $\times 10$, then relays K10 and K100 are actuated to close the contacts $a$ thereof. All of the relay switches are actuated to close contacts $a$ if the $\times .1$ scale is desired.

It should be noted that capacitor C5 may, if desired, be switched across the amplifier 10 or to ground through a resistance in the same manner as capacitor C1–C4. It is necessary, however, to maintain a capacitor charged to the output voltage across the amplifier 10 when the integrator circuit is switched from the operate to the hold condition.

Referring now to FIG. 2 there is illustrated another embodiment of the present invention in which electronic switches 30, 31 and 32 are provided for connecting the integrator circuit into the initial condition, integrating and hold modes, respectively. The electronic switches 30, 31 and 32 may be identical and of the type described in my copending application Ser. No. 512,961, filed Dec. 10, 1965, now Pat. 3,374,362 for Operational Amplifier with Mode Control Switches. The electronic switches 30, 31 and 32 employ transistors as switching elements which are schematically illustrated as a pair of contacts $a$ and a pair of contacts $b$. The contacts $a$ and $b$ are alternately closed or open in response to a control signal applied to the respective control terminals 34, 35 and 36' from a switch and relay control generator 38. When the contacts $a$ are closed the contacts $b$ are normally open and vice versa. It should be noted, however, that the electronic switches 30, 31 and 32 should be provided with a small overlap in the closure time of the two pairs of contacts to prevent the input circuit of the amplifier from floating or being grounded.

As shown, the reset switch 30 selectively connects the summing junction of the resistors R2 and R3 either to ground or to the input 11. The operate switch 31 selectively connects the summing junction of the resistor R1 and the feedback capacitor, connected to an operate terminal 36, to the input circuit of the amplifier or to ground.

The hold switch 32 selectively connects a hold terminal 37 to ground or to the input circuit 11 of the amplifier 10. A capacitor C14 is connected between the output of amplifier 12 and the hold terminal 37 at all times. A plurality of capacitors C8, C9, C10 and C11 are selectively connected to the hold terminal 37, the operate terminal 36 or through series connected resistors R14 and R15 to ground by means of relay switches K'.1, K'1.0, K'10 and K'100. Each of the relay switches K'.1–K'100 includes four pairs of contacts $a$, $b$, $c$ and $d$. The two pairs of contacts $a$ and $c$ of each relay are normally open and the two pairs of contacts $b$ and $d$ of each relay are normally closed. Each relay is energized by the switch control 38 to close contacts $a$ and $c$ and open contacts $b$ and $d$.

A capacitor C12 is selectively connected to the operate terminal or to the resistor R14 by the contacts $c$ and $d$ of the relay switch K100. Capacitor C13 is directly connected between the operate terminal 36 and the amplifier output 11. The value in microfarads for each capacitor is designated on the drawing by way of example only. Capacitors C13 and C14 are connected to the operate and hold terminals respectively, to provide a ×1000 scale. One of the additional capacitors of C8–C11 are connected to the operate terminal 36 to provide a slower time scale and the next lower value capacitor of C9–C12 is connected to the hold terminal 37 for this selected time scale as may be seen by reference to FIG. 3.

During the operate or integrating mode of the integrator circuit each of the capacitors C8–C12 that are not connected to the operate or hold terminals are connected through the resistors R14 and R15 to ground so that these capacitors will assume a charge bearing a predetermined relationship to the output voltage of the amplifier. When it is desired to change the time scale for the integrator circuit, the integrator circuit is placed in the hold condition by the control generator 38 which disconnects the input terminal 14 and the resistor R1 from the amplifier input 11 by means of switch 31 and connects the hold terminal 37 to the input 11 of the amplifier by means of the hold switch 32. After the amplifier 10 has been placed in the hold condition the relay switch K'2 is actuated to close its contacts 40 and short circuit the resistor R15. The resistance of resistor R15 is preferably large compared to the resistance of resistor R14 to prevent overloading of the amplifier during the integrating mode and to permit the capacitors connected to resistor R14 to quickly charge when the contacts of relay 40 are closed during the hold mode of operation.

When the capacitors connected to the resistor R14 have charged to a value approximately equal to the output voltage of the amplifier, one of the relay switches K.1, K1.0, K10 or K100 is actuated to switch the selected capacitor between the output 12 of the amplifier and the hold terminal 37 and the adjacent lower value capacitor between the output 12 of the amplifier and the operate terminal 36. The relay switch K'2 is also de-energized at this time. The integrator circuit may now be placed in the operate or integrate mode to continue the problem solution.

The novel integrator circuit disclosed herein permits the time scale to be changed to expand or contact the time scale with a minimum time delay before the completion of the problem solution.

Those skilled in the art will realize that the drawings are schematic representations of two embodiments of the invention. Many modifications within the scope of the subject invention are, of course, possible.

What is claimed is:

1. In an integrating circuit the combination which comprises:
   (a) an operational amplifier having an input and an output;
   (b) a signal input terminal for receiving an input signal to be integrated;
   (c) first resistance means for coupling a signal to the amplifier input;
   (d) switching means for selectively connecting and disconnecting the signal input terminal and the first resistance means in series to the amplifier input;
   (e) a plurality of capacitors, each of the capacitors having a pair of terminals;
   (f) means connecting one terminal of each of the capacitors to the amplifier output;
   (g) means for connecting the second terminal of one of the capacitors to the amplifier input to provide an amplifier output voltage that is representative of the time integral of the input signal;
   (h) second resistance means for providing a charging current path;
   (i) means for connecting the other terminal of at least one additional capacitor in series with the second resistance means and ground to permit said additional capacitor to assume a charge that bears a predetermined relationship to the amplifier output voltage; and
   (j) means for selectively disconnecting the other terminal of said additional capacitor from ground and connecting said other terminal to the amplifier input to change the time scale of the integrating circuit.

2. The combination as defined in claim 1 including means for decreasing the resistance of the second resistance means after the signal input terminal is disconnected from the amplifier input circuit to permit said at least one additional capacitor to be rapidly charged to approximately the amplifier output voltage.

3. The combination as defined in claim 2 wherein the second resistance means comprises a pair of resistors connected in series between said at least one additional capacitor and ground and said means for decreasing the resistance of the second resistance means comprises a switch connected across one of the resistors to short circuit said resistor.

4. The combination as defined in claim 3 wherein said plurality of said capacitors comprises first, second, third, fourth and fifth capacitors with the first capacitor having a value of approximately ten times the value of the capacitance of the second capacitor, the second capacitor having a value of approximately ten times the value of the third capacitor, the third capacitor having a value of approximately ten times the value of the fourth capacitor and the fourth capacitor having a value of approximately ten times the value of the fifth capacitor.

5. The combination as defined in claim 4 including a separate resistance associated with each capacitor and switching means connected individually to the first, second, third and fourth capacitors to selectively connect each of said capacitors between the input and output circuit of the amplifier and between the output circuit of the amplifier and the associated resistance means to ground.

6. In an integrating circuit the combination which comprises:
   (a) an operational amplifier having an input and an output;
   (b) a plurality of capacitors;
   (c) switching means for selectively connecting at least one of the capacitors between the input and output of the amplifier;
   (d) means for applying an input signal which is to be integrated to the amplifier input;
   (e) resistance means for providing a charging current path;
   (f) means for connecting at least one of the remaining capacitors and the resistance means in series between the amplifier output circuit and ground to permit said last named capacitor to assume a charge bearing a predetermined relationship to the instantaneous amplifier output voltage;
   (g) means for placing the integrator in a hold condition by removing the input signal from the input circuit of the amplifier and maintaining the amplifier output voltage by the charge stored on a capacitor connected between the amplifier input and output circuit;

(h) means for decreasing the resistance of said resistance means while the integrating circuit is in the hold condition to permit the capacitor connected to said resistance means to be charged to approximately the amplifier output voltage; and (i) means for disconnecting said last named capacitor from the resistance means and for connecting said capacitor between the input and output circuit of the amplifier to change the time scale of the integrating circuit.

7. In an integrating circuit the combination which comprises:

(a) an operational amplifier having an input circuit and an output circuit;

(b) an input terminal for receiving an input signal to be integrated;

(c) first resistance means for coupling a signal to the amplifier input circuit;

(d) means for generating first and second control signals;

(e) first switching means coupled to the last named means and responsive to the first control signal for connecting the input terminal and the first resistance in series to the amplifier input circuit and responsive to the second control signal for disconnecting the input terminal from the amplifier input circuit;

(f) a plurality of capacitors;

(g) means for connecting at least one of the capacitors between the input and output circuit of the amplifier to provide an amplifier output voltage that is representative of the time integral of the input signal;

(h) second resistance means for providing a charging current path;

(i) means for selectively connecting an additional capacitor in series with said second resistance means between the amplifier output circuit and ground;

(j) means for applying the control signal to the first switching means to disconnect the input terminal from the amplifier input circuit;

(k) means for decreasing the resistance of the second resistance means after the input terminal is disconnected from the amplifier input circuit to permit said additional capacitor to be charged approximately to the amplifier output voltage; and (l) means for disconnecting said additional capacitor from ground and for connecting said additional capacitor between the input and output circuit of the amplifier to change the time scale of the integrating circuit.

8. In an integrating circuit the combination which comprises:

(a) an operational amplifier having an input and an output;

(b) an input terminal for receiving an input signal to be integrated;

(c) first resistance means connected to the input terminal for coupling a signal to the amplifier input;

(d) first, second and third capacitors;

(e) means for selectively connecting and disconnecting the first capacitor between the input and output of the amplifier;

(f) means for selectively connecting and disconnecting the first resistance means to the input circuit of the amplifier to permit the amplifier to develop an output signal which is proportional to the time integral of the input signal;

(g) means for connecting the second capacitor between the amplifier output and ground to provide a charge across the second capacitor which is proportional to the instantaneous amplifier output voltage;

(h) second resistance means for providing a charging current path;

(i) means for connecting the third capacitor and the second resistance means in series between the amplifier output and ground to permit the third capacitor to assume an instantaneous charge bearing a predetermined relationship to the instantaneous amplifier output voltage;

(j) means for disconnecting the second capacitor from ground and for connecting the second capacitor between the input and output of the amplifier after the first resistance means has been disconnected from the amplifier input circuit to permit the amplifier to maintain an output voltage proportional to the charge across the second capacitor;

(k) means for decreasing the resistance of the second resistance means to permit the third capacitor to charge to a value approximately equal to the amplifier output voltage; and (l) means for disconnecting the third capacitor from ground and for connecting the third capacitor across the input and output of the amplifier to permit the time scale of the integrating circuit to be changed.

9. In an integrating circuit the combination which comprises:

(a) an operational amplifier having an input and an output;

(b) an input terminal for receiving an input signal to be integrated;

(c) an operate terminal;

(d) first resistance means connected between the input and operate terminals;

(e) operate switching means for selectively connecting the operate terminal to the input of the amplifier or to ground;

(f) a hold terminal;

(g) hold switching means for selectively connecting the hold terminal to the input of the amplifier or to ground;

(h) a plurality of capacitors;

(i) switching means for connecting at least one of the capacitors between the output of the amplifier and the operate terminal;

(j) switching means for connecting another capacitor between the output of the amplifier and the hold terminal;

(k) second resistance means;

(l) switching means for connecting at least one additional capacitor in series with the second resistance means between the output of the amplifier and ground; and (m) means for decreasing the resistance of the second resistance means when the hold switch is operated to connect the hold terminal to the input of the amplifier to permit the capacitor connected in series with the second resistance means to be rapidly charged to the amplifier output voltage.

References Cited

UNITED STATES PATENTS 3,374,362  3/1968  Miller _____ 328—127

FOREIGN PATENTS 225,975  2/1963  Austria.
237,936  1/1965  Austria.

MALCOLM A. MORRISON, Primary Examiner

F. D. GRUBER, Assistant Examiner

U.S. Cl. X.R.

235—184; 328—127; 307—229, 238